United States Patent
Anderson et al.

(10) Patent No.: US 6,832,514 B2
(45) Date of Patent: Dec. 21, 2004

(54) TIRE PRESSURE MONITORING SYSTEM WITH TRANSITION FROM STATIONARY VEHICLE TO MOVING VEHICLE CONDITIONS

(75) Inventors: John R. Anderson, White Lake, MI (US); Tim Green, Holly, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 39 days.

(21) Appl. No.: 10/341,653

(22) Filed: Jan. 14, 2003

(65) Prior Publication Data

US 2003/0131657 A1 Jul. 17, 2003

Related U.S. Application Data

(60) Provisional application No. 60/348,467, filed on Jan. 14, 2002.

(51) Int. Cl.$^7$ ............................................. G01M 17/02
(52) U.S. Cl. ..................................... 73/146.4; 340/445
(58) Field of Search ............................... 73/146, 146.2, 73/146.3, 146.4, 146.5, 118.1; 340/438, 442, 445, 446, 447, 448

(56) References Cited

U.S. PATENT DOCUMENTS

| | | | | |
|---|---|---|---|---|
| 5,463,374 A | * | 10/1995 | Mendez et al. | 340/442 |
| 5,483,827 A | * | 1/1996 | Kulka et al. | 73/146.5 |
| 5,612,671 A | * | 3/1997 | Mendez et al. | 340/447 |
| 6,215,389 B1 | * | 4/2001 | Schmidt | 340/5.1 |
| 6,340,930 B1 | * | 1/2002 | Lin | 340/447 |
| 6,591,668 B1 | * | 7/2003 | Becherer et al. | 73/146 |
| 2002/0157461 A1 | * | 10/2002 | Schmidt et al. | 73/146 |
| 2002/0167400 A1 | * | 11/2002 | Tsujita et al. | 340/443 |
| 2003/0079536 A1 | * | 5/2003 | Fischer et al. | 73/146 |
| 2003/0145650 A1 | * | 8/2003 | Juzswik et al. | 73/146 |

* cited by examiner

*Primary Examiner*—Eric S. McCall

(57) ABSTRACT

A tire pressure monitoring system monitors the periodic transmissions from each of the tire pressure monitoring sensors. If a particular sensor fails to report a counter is incremented. The count is compared to a limit, with a lower limit being set for when a vehicle is moving and a higher limit being set for when the vehicle is stationary. If the count exceeds the limit then it is determined that the particular transmitter is failing. When the vehicle transitions from stationary mode to moving mode the count is compared to limits. If the count is between two limits, then the count is reset to a lower number before the control monitors operation in moving mode. In this fashion, inaccurate identifications of a failed transmitter are reduced or eliminated by ensuring that the difference between the two limits does not result in an improper identification of a transmitter as failing when the vehicle transitions from stationary to moving mode.

10 Claims, 1 Drawing Sheet

TIRE PRESSURE MONITORING SYSTEM WITH TRANSITION FROM STATIONARY VEHICLE TO MOVING VEHICLE CONDITIONS

CROSS REFERENCE TO RELATED APPLICATIONS

This application claims priority to the U.S. Provisional Application having Ser. No. 60/348,467 filed Jan. 14, 2002.

BACKGROUND OF THE INVENTION

This application relates to a tire pressure monitoring system wherein the count rate for determining a failed sensor is adjusted as a vehicle moves from a stationary state to a moving state.

Tire pressure monitoring systems are becoming widely utilized in modern vehicles. Typically, sensors are mounted within each of the tires and sense the pressure within the tire. The sensor has a transmitter to communicate through a wireless link, typically an RF link, with a control on the vehicle. The control is able to display any tire that has a low pressure condition to the vehicle operator.

These systems increase the safety of vehicle operation by reducing the number of vehicles operating with improperly inflated tires. However, many design challenges are raised in the implementation of these systems. One major challenge is monitoring whether the transmitters and sensors are operational. Thus, the control typically looks for expected transmissions from each of the sensors. The sensors are typically expected to transmit pressure information on some periodic basis. The counter counts the number of times a particular transmitter has failed to report when expected. Many conditions can result in a failure to report occasionally. Thus, the systems have a particular limit of failures to report before a transmitter is identified as failed.

Tire pressure monitoring systems are somewhat more reliable in their reporting when the vehicle is moving. When the vehicle is moving, there are fewer potentially interfering foreign bodies continuously adjacent to the vehicle. On the other hand, when a vehicle is parked, other vehicles may be parked nearby and other foreign objects may also be near the vehicle. For many reasons, the presence of such objects will sometimes reduce the ability of the control to properly receive a signal from the tire pressure transmitters.

Thus, it has been proposed that a higher failed transmitter count rate be utilized for a non-moving vehicle than the count rate utilized for a moving vehicle. Thus, in one case, if a vehicle is moving, 20 sequential missed messages may set the limit for the identification of a failed transmitter. However, when the vehicle is stationary, 72 missed messages may be the count limit. Obviously, other numbers would come within the scope of this invention.

Problems still exist with this basic format, however, in that the prior art has not successfully considered what may occur in the transition between a stationary vehicle to a moving vehicle due to the two different count limits.

SUMMARY OF THE INVENTION

In a disclosed embodiment of this invention, a method and control for a tire pressure monitoring system count the number of failures to transmit. If the vehicle is moving below a predetermined speed for a predetermined amount of time, then a higher "stationary vehicle" limit is utilized and compared to the count. On the other hand, while the vehicle is moving more quickly, a lower "moving vehicle" limit is compared to the count.

The determination that a vehicle is stationary typically requires the vehicle to be moving below a particular rate of speed (i.e., 20 miles per hour) for a particular period of time. While the particular period of time may be 0 minutes, typically such systems require the vehicle to be below the speed limit for a period of time to eliminate the determination the vehicle is stationary, and should move into stationary mode, when the vehicle may be simply stopped at a stop sign, or in traffic. Thus, it is often the case that the vehicle will not move into the "stationary vehicle" mode until it has been below the rate of speed for several minutes.

In the present invention, if a determination is made that a vehicle which had been in "stationary vehicle" mode has returned to the "moving vehicle" mode, then the number of failed transmitter counts may be reset. In a preferred embodiment, the system asks whether the count is between a lower limit and an upper limit. If so, then the count is reset to a number slightly below the lower limit. In this way, if a stationary vehicle has a transmitter with several failure to transmit occurrences in its count, the transmitter will not be immediately identified as having failed once the vehicle returns to a moving state. Moreover, in a most preferred embodiment the reset number and the number for triggering the reset may be slightly below the first limit as this would also allow for the transmitter to have a few expected cycles which could be missed even after the vehicle begins moving before the determination of a failed transmitter is made.

These and other features of the present invention can be best understood from the following specification and drawings, the following of which is a brief description.

DETAILED DESCRIPTION OF THE PREFERRED EMBODIMENT

Figure 1:
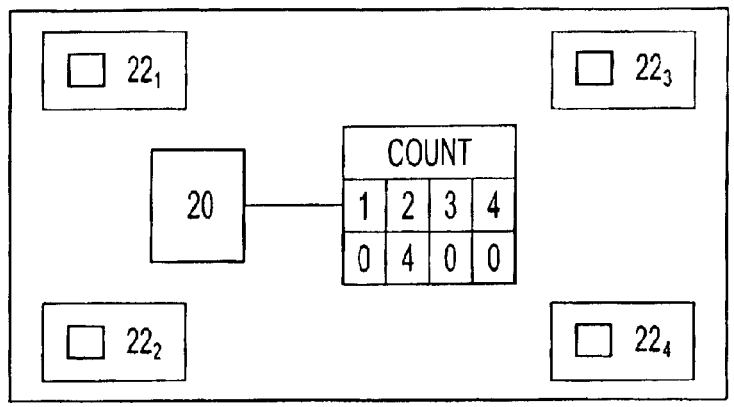
FIG. 1 is a schematic view of a vehicle incorporated in the present invention.

A vehicle 18 is illustrated schematically in FIG. 1. A, control 20 receives signals from a tire pressure monitoring sensor/transmitter $22_1$, $22_2$, $22_3$ and $22_4$.

Figure 2:
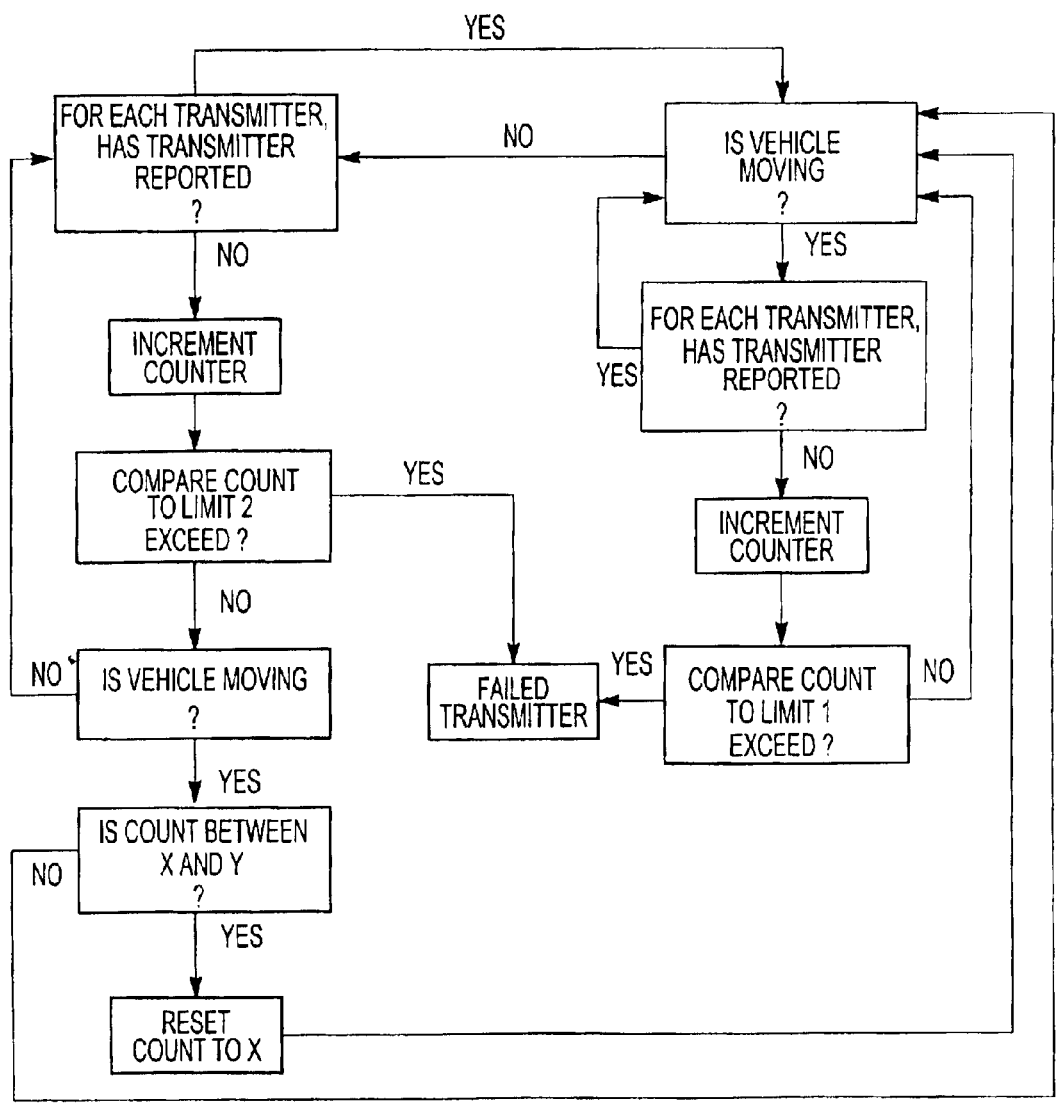
FIG. 2 is a flow chart for the present invention.

As shown, the control maintains a count for each of the transmitters of the number of consecutive failures to transmit. Each of the transmitters, as known, is controlled to report on a periodic basis. Thus, if the control does not receive a transmission from a particular transmitter, a determination is made that a failure to report has occurred and the counter is incremented for the particular transmitter. As shown in FIG. 2, the transmitter $22_2$ is shown as having a count, while the other transmitters have no failures. At some point, the count may exceed a preset limit, and then the transmitter may be determined to have failed.

As mentioned above, it is known in the prior art to set two limits, with a higher limit being set for when the vehicle is stationary, and a lower limit being set for when the vehicle is moving. Again, the term "vehicle moving" is typically associated with a minimum speed, and often, the determination that a vehicle is "stationary" requires that the vehicle not be above the predetermined speed for a particular period of time. However, this invention would also extend to a system wherein the term "stationary" could be determined immediately when the vehicle stops, and also requiring no speed rather than simply being below the particular speed. The present invention relates instead to how the control transitions the count from stationary mode to moving mode.

For purposes of explaining the basic invention, consider a system wherein if the vehicle is moving less than 20 mph it is defined as being stationary. When the vehicle is moving, a first lower limit of 20 failed transmissions would identify the transmitter as being failed. On the other hand, if the vehicle is determined to be stationary then a second upper limit of 72 failed transmissions is utilized.

As shown in the flowchart of FIG. 2, the system first asks whether the vehicle is moving. If so, the system then continues to ask whether each of the transmitters has periodically reported. If each transmitter does report, then the system continues. If a particular transmitter fails to report then a counter is implemented.

The count is compared to the lower Limit 1 and if the count exceeds the Limit 1 then a failure is indicated. If not, the system continues to monitor operation.

If it is determined the vehicle is not moving, the control also monitors whether each transmitter periodically reports and failures are counted. At this point the counter is compared to upper Limit 2. If the counter exceeds the upper Limit 2 then a failure is again indicated. If the counter does not exceed the upper Limit 2, then the system continues. At all times, the control is aware of whether the vehicle has transitioned from stationary to moving mode. If the vehicle does continue to be stationary, then the control simply continues to count failures to transmit. The system to this point is generally as is known in the prior art.

However, once it is determined that the vehicle has begun moving, then the control asks whether the count is between two limits X and Y. Typically, the limits X and Y would be one slightly below Limit 1, and Limit 2. If the count is not between the two limits, then the system simply moves into moving vehicle mode, and the stored count is utilized and to evaluate the transmitter under moving mode. At any point, should a transmission be received then the count is reset to 0.

On the other hand, and returning to the step of comparing the count to the two limits X and Y, if the count is between the two limits, then the count is reset to some lower value, and in a preferred embodiment X. Again, X is preferably selected to be several transmission reporting failures below the Limit 1 such that the system has a few cycles to begin to transmit after the vehicle has begun to move before the failure is indicated.

The above invention limits the number of false errors from the transmitters by insuring that the simple transition from stationary to moving vehicle mode will not result in any improper identifications of a failed transmitter.

Although a preferred embodiment of this invention has been disclosed, a worker of ordinary skill in the art would recognize that certain modifications will come within the scope of this invention. For that reason the following claims should be studied to determine the true scope and content of this invention.

What is claimed is:

1. A method of monitoring transmitters on a vehicle comprising the steps of:
   1) providing transmitters which periodically transmit signals to a control, and monitoring transmissions of said signals;
   2) counting failures to send said signal from said transmitters;
   3) determining whether a vehicle is in a stationary mode or is in a moving mode, and identifying limits for a transmitter associated with the vehicle in both stationary and moving modes;
   4) comparing said count to either said stationary vehicle limit or said moving vehicle limit, and identifying a failed transmitter based upon said comparison; and
   5) resetting said count to a lower limit under at least some situations when said vehicle transitions from stationary mode to moving mode.

2. A method as set forth in claim 1, wherein stationary mode is defined by said vehicle moving below a predetermined speed.

3. A method as set forth in claim 1, wherein transmitters are transmitting tire pressure information from each of several tires associated with said vehicle.

4. A method as set forth in claim 1, wherein said count is reset when said vehicle transitions from stationary mode to moving mode with an algorithm that first looks at whether said count is between an upper and lower limit, and resetting said count only if said count is between said upper and lower limit.

5. A method as set forth in claim 4, wherein said lower limit is selected to be a few transmission failures below said moving mode vehicle limit.

6. A system comprising:
   a plurality of transmitters mounted on a vehicle and periodically sending a signal to a control; and
   said control being provided with a receiver for receiving said periodically transmitted signals, and for identifying and counting failures to transmit for each of said transmitters, said control storing a moving limit and a stationary limit to compare said count dependent upon whether said vehicle is moving or stationary, said control identifying a failed sensor based upon said comparison, said moving limit being lower than said stationary vehicle limit, and said control resetting said count to a lower limit under at least some situations when said vehicle transitions from stationary to moving.

7. A system as act forth in claim 6, wherein stationary mode is defined by said vehicle moving below a predetermined speed.

8. A method as set forth in claim 6, wherein said control resets said count when said vehicle transitions from stationary mode to moving mode with an algorithm that first looks at whether said count is between an upper and lower limit, and resetting said count only if said count is between said upper and lower limit.

9. A method as set forth in claim 8, wherein said lower limit is selected to be a few transmission failures below said moving mode limit.

10. A method as set forth in claim 6, wherein said transmitters are associated with tire pressure sensors.

* * * * *